May 13, 1941.   L. E. GABOURY   2,242,065
TROLLEY CONVEYER
Filed Sept. 16, 1940   2 Sheets-Sheet 1
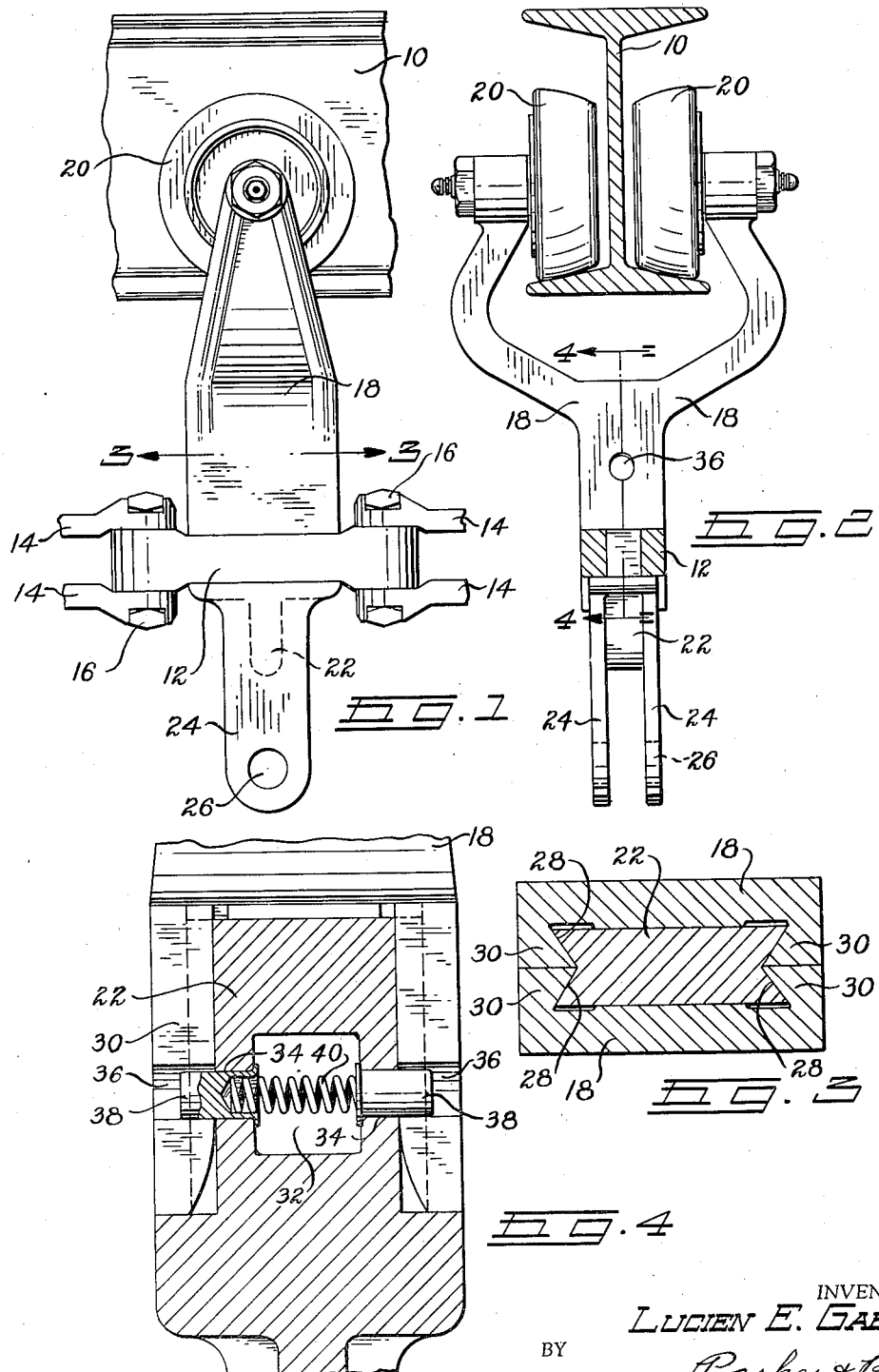
INVENTOR.
LUCIEN E. GABOURY
BY
Parker & Burton
ATTORNEYS.

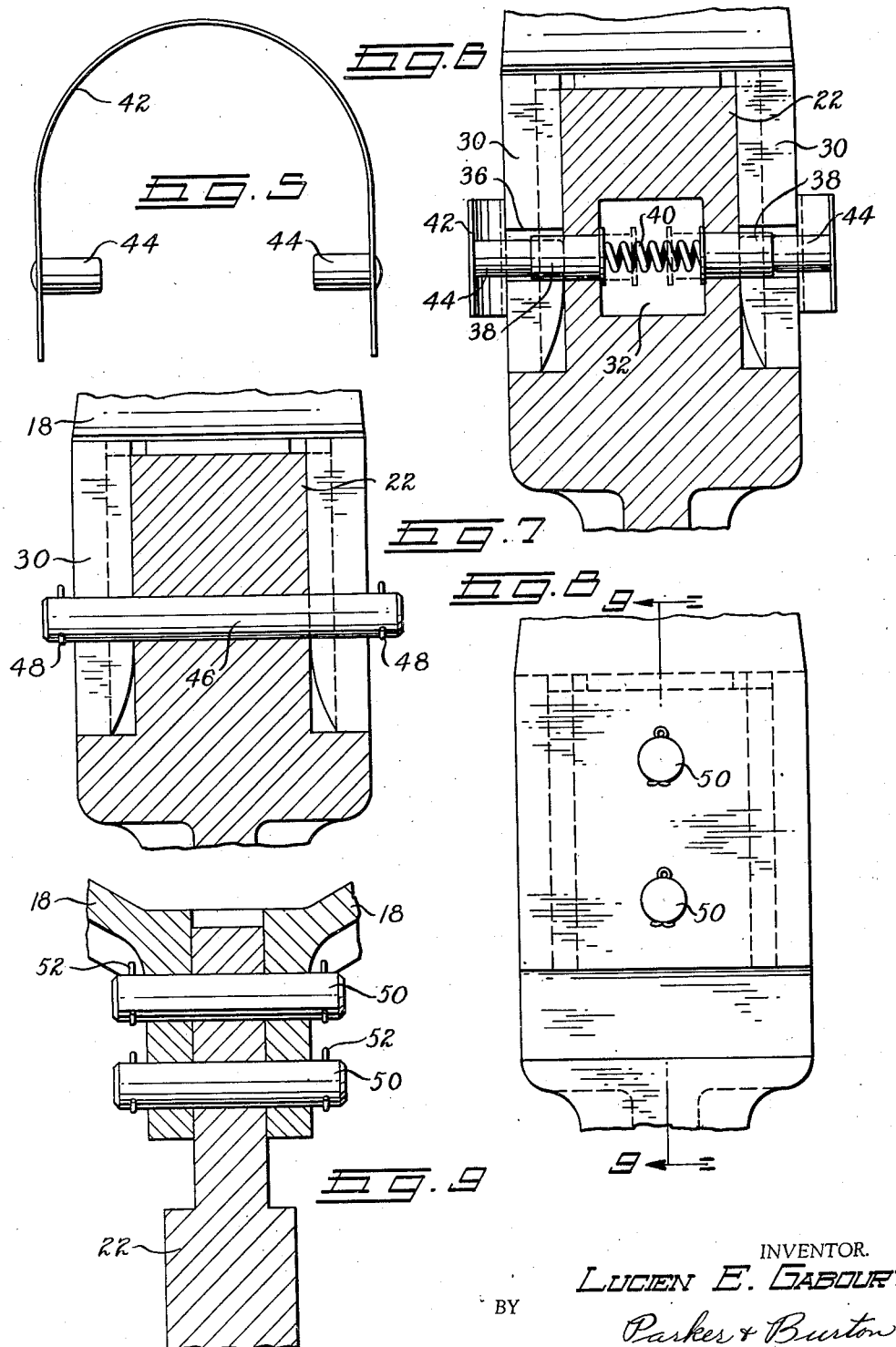

Patented May 13, 1941

2,242,065

UNITED STATES PATENT OFFICE 2,242,065

TROLLEY CONVEYER

Lucien E. Gaboury, Detroit, Mich., assignor to Allied Steel & Conveyors, Inc., Detroit, Mich., a corporation of Michigan Application September 16, 1940, Serial No. 356,910

20 Claims. (Cl. 198—177)

This invention relates to conveyers and particularly to trolleys adapted to travel along an overhead conveyer rail. This application constitutes a continuation in part of application Serial No. 298,269, filed October 6, 1939, and entitled "Overhead conveyer coupling."

Heretofore, trolleys for conveyers have been constructed of separable parts secured together by bolts, nuts and screws. Such forms of connections were liable to loosen or to become broken in use, dividing the conveyer and causing stoppage of work and possible damage to equipment and injury to persons. Moreover, considerable time was required to connect and disconnect these forms of connections when repairs or substitution of parts were made.

An important object of this invention is to provide a novel construction for conveyer trolleys and the like which dispenses entirely with the use of threaded connecting members such as bolts, nuts and screws and provides a new form of conveyer trolley which is strong, rugged and may be quickly connected and disconnected when in operating position. An important feature is the provision of novel interlocking means for securing the separate parts of the trolley together. All three primary members of the trolley, the two side brackets and the load carrying member, are rigidly held by the interlocking form of connection. Correspondingly shaped grooves and flanges slidingly interlock so that the simple movement of the load carrying member between the trolley brackets automatically locks all three members together.

Another important feature is the provision of novel pin-like connecting elements for holding the article carrying member to the side frames of the trolley. In one form of the invention illustrated herein the locking elements are plungers automatically operable to shift into locking position when the parts are in properly assembled position. In another form of the invention pins are used which take the load but are relieved of any lateral pressure by the novel interlocking connection.

Various other objects, advantages and meritorious features will become more fully apparent from the following specification, appended claims and accompanying drawings, wherein;

Fig. 1 is a front elevation of a conveyer trolley constructed in accordance with this invention showing it in operating position on a conveyer rail, Fig. 2 is a side elevation of the trolley in Fig. 1, Fig. 3 is an enlarged sectional view of the trolley assembly along lines 3—3 of Fig. 1, Fig. 4 is an enlarged sectional view of the trolley assembly along lines 4—4 of Fig. 2, Fig. 5 is a side elevation of a tool for disconnecting the parts of one form of trolley construction herein described, Fig. 6 is a sectional view of the trolley assembly similar to Fig. 4 but showing the tool in the act of releasing the parts for disengagement, Fig. 7 is a sectional view like Fig. 4 but showing a modification of the invention wherein a pin is used in place of the plungers to hold the load carrier within the trolley brackets, Fig. 8 is a front view of a part of the trolley assembly showing a different modification of the invention utilizing short connecting pins, and Fig. 9 is a sectional view along line 9—9 of Fig. 8.

The trolleys embodying the invention described herein are used primarily in connection with overhead track 10 which is generally of an I-beam construction, as illustrated in Figs. 1 and 2. The trolleys run along this track at spaced intervals and are connected together by a chain of links, one type of which is illustrated in Fig. 1 consisting alternately of slotted single links 12 and double links 14—14 having their ends overlapping upon one another and connected together by pins 16. The construction is well known in the art. The trolley assembly of this invention may be used with other forms of track and chain constructions if desired.

The trolley proper comprises a track engaging carriage including a body formed of two separable parts generally termed side frame members or brackets and a load carrying member which is disconnectedly attached to the side frame members. The side frame members are indicated at 18—18. The two members are so shaped that when brought together in proper assembled relation, two end sections are spaced apart to overlap upon the track 10 and the other end sections are brought into juxtaposition. The spaced ends of the frames carry wheels 20—20 for running on the track.

The load carrying member is indicated at 22. It is formed with a depending end section which may be shaped in any suitable way for holding an article. In the illustrated embodiment of the invention, member 22 is provided with two depending arms 24—24 provided with aligned apertures 26—26 for the reception of a hook to which an article is attached. The opposite end of the member may be reduced in width to form a head. This head is disposed between the side frame members 18—18 and secured thereto by the novel form of connection to be described.

The head of the article carrying member 22 is disconnectedly secured to the frame members or brackets 18—18 by a novel form of sliding interlocking joint. The members are provided with correspondingly shaped grooves and projections which engage with one another and because of their construction prevent pulling apart or separation of the elements. This interlocking engagement is accomplished quickly and easily by the simple movement of inserting the head of the article carrying member between the juxtaposed end sections of the trolley carriage. Preferably, the juxtaposed lower ends of the trolley form a socket opening downwardly for receiving the head. Upon insertion of the head in this socket, portions of the members slidingly interfit with one another and interlock the parts together against separation laterally. When the head has been advanced into the socket the proper distance, load carrying means in the form of pins or plungers may be used to extend transversely through the members to hold the head within the trolley brackets.

In the embodiment illustrated herein, the sliding interlocking joint is accomplished by providing longitudinal grooves 28—28 in the opposite side edges of the head of the article carrying members. These grooves open out through the top of the head. They are preferably V-shape in cross section but may be of other formations if desired. The side frame members 18—18 are provided with projections or flanges which overlap the side edges of the head and enter the grooves. Each bracket 18 carries a pair of such flanges, indicated at 30—30 in the drawings. These flanges are shaped to occupy and slidingly engage one-half of the V-groove with which they are associated. Preferably the flanges on one bracket abut those on the other and form complementary halves of V-shaped projections which slidingly fit the V-shaped grooves in the head. The resulting construction and relation of the parts is that illustrated in Fig. 3. The confronting faces of the brackets 18—18 are spaced from one another by the abutment of the flanges. There is thus formed a socket into which the head is slidingly introduced and interlocked. The lower ends of the flanges 30—30 may be flared as shown in Fig. 4 to facilitate insertion of the head.

In order to hold the head within the side frame members of the trolley and transmit the load to the trolley wheels and conveyer track, various forms of connecting devices may be employed. In one form illustrated in Figs. 4 and 6, spring pressed plungers are used. In other forms illustrated in Figs. 7, 8 and 9, pins are used.

In the spring pressed plunger form of connection, the head is provided with a central pocket 32 which opens out through the opposite faces of the head. Aligned passages 34—34 are formed in the head which extend from opposite sides of the pocket and open out through the bases of the V-grooves 28—28. The brackets 18—18 are each shaped with aligned transversely extending semi-circular grooves in the flanges 30—30 which when the brackets are brought together form passages 36—36, one of which is shown in the side view in Fig. 2. Reciprocal in the passages 34—34 are pin-elements or plungers 38—38. These plungers are provided with flared inner ends limiting their outward movement. A coil spring 40 has its opposite ends seated in recesses formed in the plungers and yieldingly forces the plungers to their outermost position. In this position they project from the V-grooves in the head. When the latter is inserted into the socket formed by the brackets 18—18, the plungers are forced by the flanges 30—30 to withdraw into the head until they are opposite the passages 36—36 at which time they will spring out into the passages 36—36, locking the head in place. They are shown in this position in Fig. 4.

To disengage the plungers from their locking position in order to separate the parts of the trolley, a special tool of the type illustrated in Fig. 5 may be used. It comprises a yoke or U-shaped member 42 formed of spring steel or the like and carrying lugs 44—44 on its opposite ends facing inwardly in alignment with one another. The yoke is of a size to straddle the trolley assembly and the lugs of a size to enter the passages. When thus positioned with the lugs in the passages, the yoke may be manually collapsed and force the plungers 38—38 inwardly until the ends are withdrawn within the head. In Fig. 6 the tool is shown in full lines in initial operating position. When compressed, the lugs force the plungers inwardly and in fully released position the parts assume the position shown in dotted lines in Fig. 6. The head may then be withdrawn.

In place of plungers, pins may be used. In Fig. 7, a pin 46 extends through the trolley brackets and the head and their respective flanges 30 and V-grooves 28. To accommodate the pin, a passage is drilled or otherwise formed in the head and the flanges 30 grooved semi-circularly as previously described to form aligned passages. Since the interlocking joints between the brackets and the load carrier prevent lateral separation of the parts, the pin may be retained in operating position by any simple expedient, such as cotter pins 48 on the projecting extremities thereof. Cotter pins are desirable for quick disengagement of the parts. A comparatively heavy hammer blow on one end of the pin will shear the cotter pin obstructing the movement and drive the pin completely through the assembly.

Another form of pin connection is shown in Figs. 8 and 9. Here two pins 50—50 are used which extend at right angles to the previously described pin 46 and from one side of one bracket to the other side of the other bracket. Similarly as in Fig. 7, the pins may be retained in place by cotter pins 52.

In the embodiment illustrated herein, the aligned passages in the brackets and load carrier are so formed that the upper ends of the arms 24—24 terminate short of the lower ends of the brackets. This forms a neck which the link 12 straddles. In the assembly operation the head of the load carrier 22 is thrust upwardly through the link and into the socket formed by the brackets 18—18. When locked into position by the pins or plungers, the upper wider ends of the arms 24—24 form a shoulder upon which the link bears.

The trolley constructions described eliminate the need of threaded members, such as nuts, bolts and screws, to attach and hold the parts together. The sliding interlocking joints formed by the V-grooves 28 and flanges 30 insure a positive connection between the trolley brackets and the load carrier preventing these members from lateral movement away from one another. The pins or plungers function to hold the head of the load carrier between the trolley brackets and transmit the load to the trolley wheels and the conveyer track. There is therefore no need for threaded members of any type for holding the parts together.

What I claim is:

1. In a conveyer trolley having separable frame members, a load carrying member having a head insertable between said frame members, portions of said frame members slidingly interfitting with portions of said head as the latter is inserted between the former, the engagement between said portions interlocking the members together so that the frame members and the heads of the load carrying member are held against lateral separation from one another, and means for holding the head of the load carrying member from slidable withdrawal from between the frame members.

2. In a conveyer trolley having separable frame members, a load carrying member having a head insertable between said frame members, portions on said frame members slidingly interlocking with the head of the load carrying member as the latter is inserted between the frame members, and detachable means extending into all three members and holding the load carrying member from withdrawal from between the frame members.

3. In a conveyer trolley having separable frame members, a load carrying member having a head insertable between said frame members, said frame members each provided with undercut wall portions, said head shaped to slidingly fit into said undercut wall portions to interlock the parts together against lateral separation, and means for holding the head of the load carrying member from slidingly withdrawing from between the frame members.

4. In a conveyer trolley having separable parts, projections on the confronting faces of said parts so disposed as to abut and hold the parts in spaced relation, a load carrying member having a head slidably fitting between said parts and along side of said projections, the portions of said head adjacent said projections being longitudinally grooved, said projections shaped to enter said grooves and interlock the parts to the member, and means for holding the head from slidingly withdrawing from between said parts.

5. In a conveyer trolley having separable parts, flanges projecting from the adjacent faces of said parts along the side marginal portions thereof, said flanges abutting one another to hold the parts in spaced relation thereby forming a socket, a load carrying member having a head slidably insertable into said socket, the opposite side edges of said head being longitudinally grooved, and said flanges on said parts having inturned edges entering the grooves in said head to interlockingly secure the parts together against lateral separation, and means for releasably holding the head from slidable movement in said socket.

6. A conveyer trolley comprising an article carrying member provided with grooved portions on opposite sides thereof, a pair of frame members carrying wheels having projecting portions slidingly interfitting with said grooved portions, and means for releasably holding the article carrying member from sliding movement relative to said frame members.

7. A conveyer trolley comprising a frame member carrying a wheel, an article carrying member, one of said members having a groove therein with an undercut wall portion, the other member having a projection of a size to slidingly fit said groove and engage the undercut wall portion to lock the two members against lateral displacement, and means for holding said members together against slidable movement tending to separate the same.

8. A conveyer trolley comprising a pair of frame members carrying wheels, an article carrying member, adjacent portions of said frame members and said article carrying member slidingly interfitting with one another to hold the parts from lateral displacement with respect to one another, and pin means extending from said frame members to said article carrying member and acting to hold the parts from longitudinal displacement with respect to one another.

9. A conveyer trolley comprising, in combination, a pair of side frame members carrying wheels, said side frame members forming a socket opening out through the bottom thereof, an article carrying member received within said socket, adjacent wall portions of frame members interlocking with said article carrying member to hold the parts from spreading laterally, and removable pin-like means extending transversely to the trolley assembly and entering the frame members and the article carrying member to hold the latter within the socket of the frame members.

10. In a trolley conveyer, the combination of a load carrying member, separate trolley wheel carrying brackets formed with lower portions adapted to lie in close engagement with the opposite faces of said member, means for retaining the member between the brackets, portions of said brackets extending around the opposite side edges of the member and interlockingly received in recesses formed in the side edges of the latter.

11. In an overhead conveyer trolley, a track engaging carriage including a body formed of separable side sections having their confronting inner side faces provided with inwardly projecting flanges along their sides and forming a socket open at its bottom, a load carrier having a head slidable into and out of said socket through the open lower end thereof, the opposite side edges of said head being longitudinally grooved to slidingly receive said flanges and interlock the parts together, and means to hold the head of the load carrier within said socket.

12. In an overhead conveyer trolley, a track engaging carriage including a body formed of companion side sections having undercut ribs along their side edges contacting with one another and defining a socket in the body open at its lower end, a load carrier having a shank slidably receivable in said socket and having its opposite side edges formed with grooves adapted to receive said ribs and provide interlocking engagement between the shank and the side sections of the body to hold the body sections in engagement with one another, said side sections and said shank provided with apertures which are adapted to be brought into alignment, and one or more removable pin-like elements receivable in said apertures for retaining the shank of the carrier within the socket.

13. In an overhead conveyer coupling, a track engaging carriage including a body formed of companion side sections having undercut ribs along their side edges contacting with each other and defining a socket in the body open at its lower end and undercut along the ribs, openings being formed through the ribs, a load carrier having a shank at its upper end slidable into and out of said socket and having edge faces formed with grooves receiving said ribs and providing interlocking engagement between the shank and the side sections of said body to hold the said body sections in engagement with each other, plungers slidably carried by said shank transversely thereof and yieldably held extended for engagement in the openings of the body to releasably hold the shank in the socket, and means for shifting said plungers inwardly to a releasing position and allowing withdrawal of the shank from the socket.

14. In an overhead conveyer coupling, a track engaging carriage including a body formed of separable side sections having their confronting inner side faces formed with registering recesses undercut along their sides and forming a socket open at its bottom and inwardly projecting ribs along opposite edge walls of the socket, openings being formed transversely through the ribs intermediate the depth of the socket, a load carrier having a head slidable into and out of the socket through the open lower end thereof, said head having a pocket formed therein and passages leading from the pocket for registering with the openings of the body when the head is thrust into the socket, plungers slidable through said passages with their inner ends disposed within the pocket and provided with means for limiting outward movement of the plungers, a spring between inner ends of said plungers urging the plungers outwardly for engagement in the openings of the body to releasably secure the head in the socket, said head having its edge faces formed with grooves receiving said ribs to hold the body sections in engagement with each other, and means for forcing said plungers inwardly to a retracted position allowing withdrawal of the head from the socket.

15. In an overhead conveyer trolley, a track engaging carriage including a body formed of separable side sections having their confronting inner faces provided with flanges along their side margins projecting toward one another and undercut on their inwardly facing sides, said sections forming with the cooperation of said flanges a socket opening out through the bottom of the body, a load carrier having a head slidable into and out of said socket through the open bottom thereof, the opposite side edges of said head being longitudinally grooved to slidingly receive the undercut flanges and thereby interlock the parts together against lateral displacement, said side sections and said head provided with apertures which when the head is disposed in a certain position in said socket will be in alignment, and one or more pin-like elements removably receivable in said apertures and adapted to extend from the side sections to the head to hold the latter from withdrawal from the socket.

16. In an overhead conveyer, a track engaging carriage including a body formed of companion side sections having undercut ribs along their side edges contacting with each other and defining a socket in the body open at its lower end and undercut along the ribs, said side sections being formed with recesses therein opening into said socket, a load carrier having a shank at its upper end slidable into and out of said socket and having edge faces formed with grooves receiving said ribs and providing interlocking engagement between the shank and the side sections of said body to hold the said body sections in engagement with each other, and plungers slidably carried by said shank transversely thereof and yieldably held extended for engagement in said recesses formed in the side sections of the body to releasably hold the shank in the socket.

17. In an overhead conveyer, a track engaging carriage including a body formed of separable side sections having their confronting inner side faces shaped with registering recesses undercut along their sides and forming a socket open at its bottom and inwardly projecting ribs along opposite edge walls of the socket, said ribs shaped with transverse recesses intermediate the depth of the socket which cooperates with another to form openings entering the socket on opposite sides of the body, a load carrier having a head slidable into and out of the socket through the open lower end thereof, said head having a pocket formed therein and passages leading from the pocket for registering with the openings of the body when the head is thrust into the socket, plungers slidable through said passages with their inner ends disposed within the pocket and provided with means for limiting outward movement of the plungers, and a spring between inner ends of said plungers urging the plungers outwardly for engagement in the openings of the body to releasably secure the head in the socket, said head having its edge faces formed with grooves receiving said ribs and providing interlocking engagement between the head and the side sections of the body.

18. A conveyer comprising a member adapted to move along a track; a second member to which a load is adapted to be attached; one of said members provided along one face with a groove opening out on one side of the member and undercut along the opposite side walls thereof; a projection provided along one face of the other member shaped to slidingly fit into the groove of the former member through the open end thereof and engage the undercut side walls thereof to hold the two members together against lateral separation; said members provided with recesses which, when the members are slidingly fitted together and assume a given position, are disposed in alignment with one another; and means in the form of a pin insertable into said recesses when in alignment and extending partly into one recess and partly into the other to hold the members together against longitudinal sliding separation.

19. A conveyer unit comprising a member adapted to move along a track, a second member to which a load is adapted to be attached, means on adjacent faces of said members forming a sliding interlocking joint therebetween which resists pulling apart in all directions except the direction of sliding movement, said members provided with openings adapted to be brought into alignment with one another when the members are interlocked together and slidingly moved to a given position, a pin insertable into said openings when in alignment and functioning hold the two members against sliding movement relative to one another, said pin having a length such that it projects from opposite sides of the unit, and means on the projecting ends of said pin normally preventing the pin from falling out of the openings, said means being shearable against the sides of the unit when the pin is struck a heavy blow in a direction to drive the pin through the openings and out the other side of the unit.

20. A conveyer unit comprising a track engaging carriage including a pair of side frame members, a load carrying member, adjacent portions of said frame members and said load carrying members slidingly interlocking with one another to hold the parts from lateral displacement with respect to one another, said members provided with apertures extending generally transversely to the direction of sliding movement of the parts and adapted in one position of the parts to be in alignment with one another, a pin insertable through said apertures when in alignment and having such a length that the ends thereof project from the opposite sides of the unit, and means on the projecting ends of the pin normally preventing the pin from falling out of the apertures, said means being shearable against the side of the unit when the pin is struck a heavy blow in a direction to drive it through the apertures from one side of the unit to the other.

LUCIEN E. GABOURY.